HOWARD M. CROW
INVENTOR

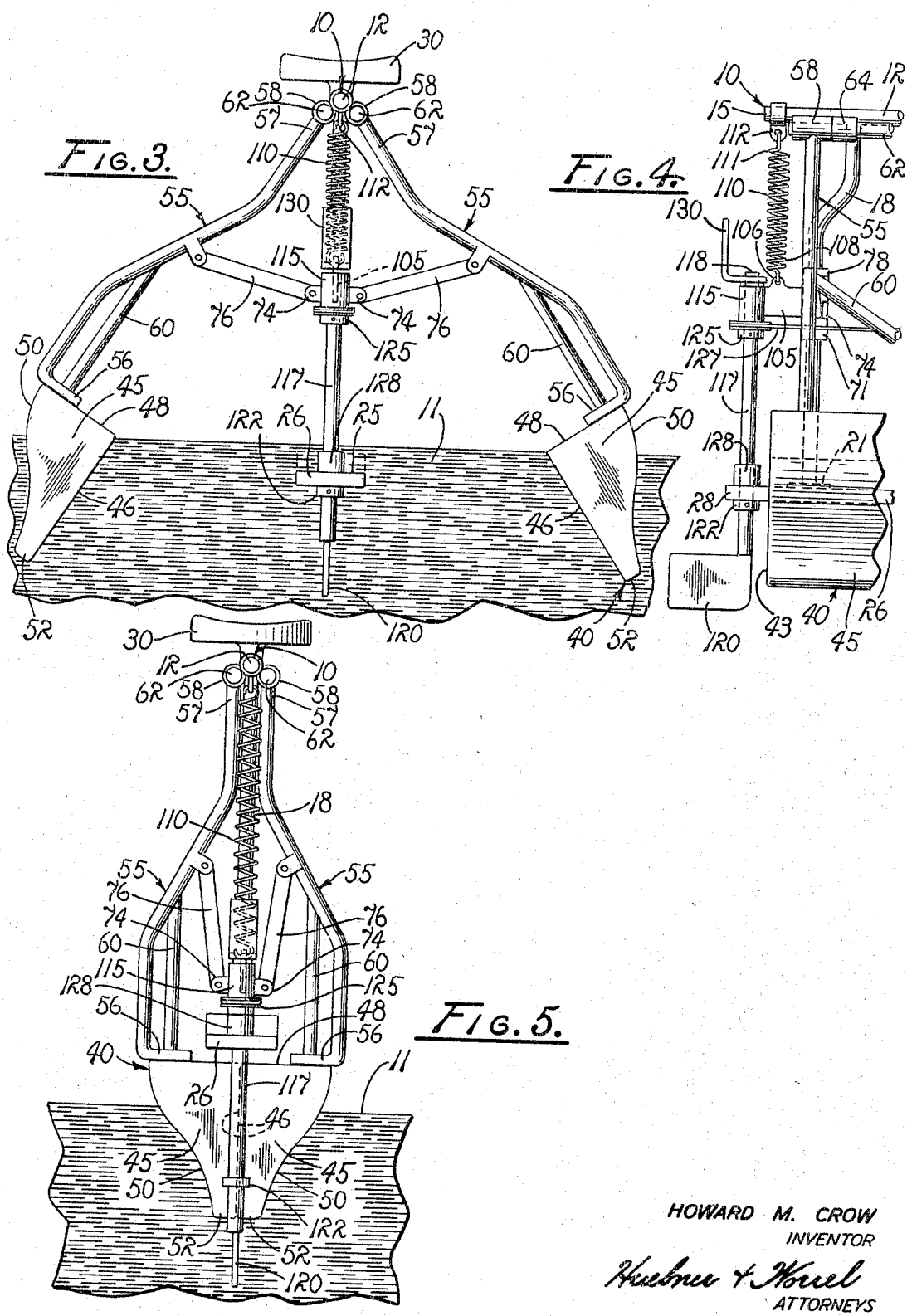

United States Patent Office 3,323,483
Patented June 6, 1967

3,323,483
WATER BORNE VEHICLE
Howard M. Crow, P.O. Box C, Three Rivers,
Calif. 93271
Filed May 2, 1966, Ser. No. 546,786
10 Claims. (Cl. 115—70)

The present invention relates to a water borne vehicle adapted to be propelled upon the surface of a body of water and more particularly to such a vehicle which provides a relatively stable "at rest" position in the water for dependably supporting a rider thereon which is automatically adjusted for relatively high speed operation providing maximum maneuverability incident to being propelled through the water.

Conventional water borne sporting vehicles such as water skis, surfboards and the like require that the persons using the vehicles have appreciable athletic ability. In order to achieve any degree of proficiency on such vehicles, the user is required to spend many hours practicing and usually must first obtain expert instruction before even attempting their use. Such vehicles present a minimum of surface contact with the water in order to provide maximum maneuverability at high speeds and are consequently less stable at relatively slow speeds. In this respect, water skis are particularly unstable and entirely incapable of supporting a person thereon in the normal standing position when the skis are at rest in the water. Furthermore, such conventional vehicles require the user to be disposed in such standing position during high speed maneuvering.

Accordingly, it is an object of the present invention to provide a water borne vehicle having improved stability as compared with existing water borne vehicles during relatively slow speed operation and when at rest in the water.

Another object is to provide such an improved water borne vehicle which is capable of being operated by relatively inexperienced persons and without appreciable athletic ability.

Another object is to provide a water borne vehicle of the character described which affords such maximum stability but which is easily and highly maneuverable throughout its entire range of operating speeds.

Another object is to provide a water borne vehicle which is capable of supporting a person in a sitting position.

Another object is to provide a water borne vehicle which is capable of supporting a person in such sitting position under all speed conditions and even when the vehicle is at rest in the water.

Another object is to provide a water borne vehicle which is capable of supporting a person in such sitting position without requiring any balancing effort by such person.

Another object is to provide a water borne vehicle which may be towed behind a powered boat.

Another object is to provide a water borne vehicle which is capable of being alternatively powered by an outboard motor.

Another object is to provide a water borne vehicle capable of utilizing a rudder which is easily controlled by the rider for improved steering of the vehicle in all operational speeds.

Other objects and advantages of the present invention will subsequently become more clearly apparent upon reference to the following description in the specification and accompanying drawings.

In the drawings:

FIG. 3 is a rear elevation of the water borne vehicle showing its hull disposed in its separated position.

FIG. 4 is a fragmentary side elevation of the rearward end of the water borne vehicle with the hull sections disposed in their separated position of FIG. 3.

FIG. 5 is a rearward elevation with the hull sections disposed in facing engagement in their planing or maneuvering position of FIGS. 1 and 2.

Figure 1:
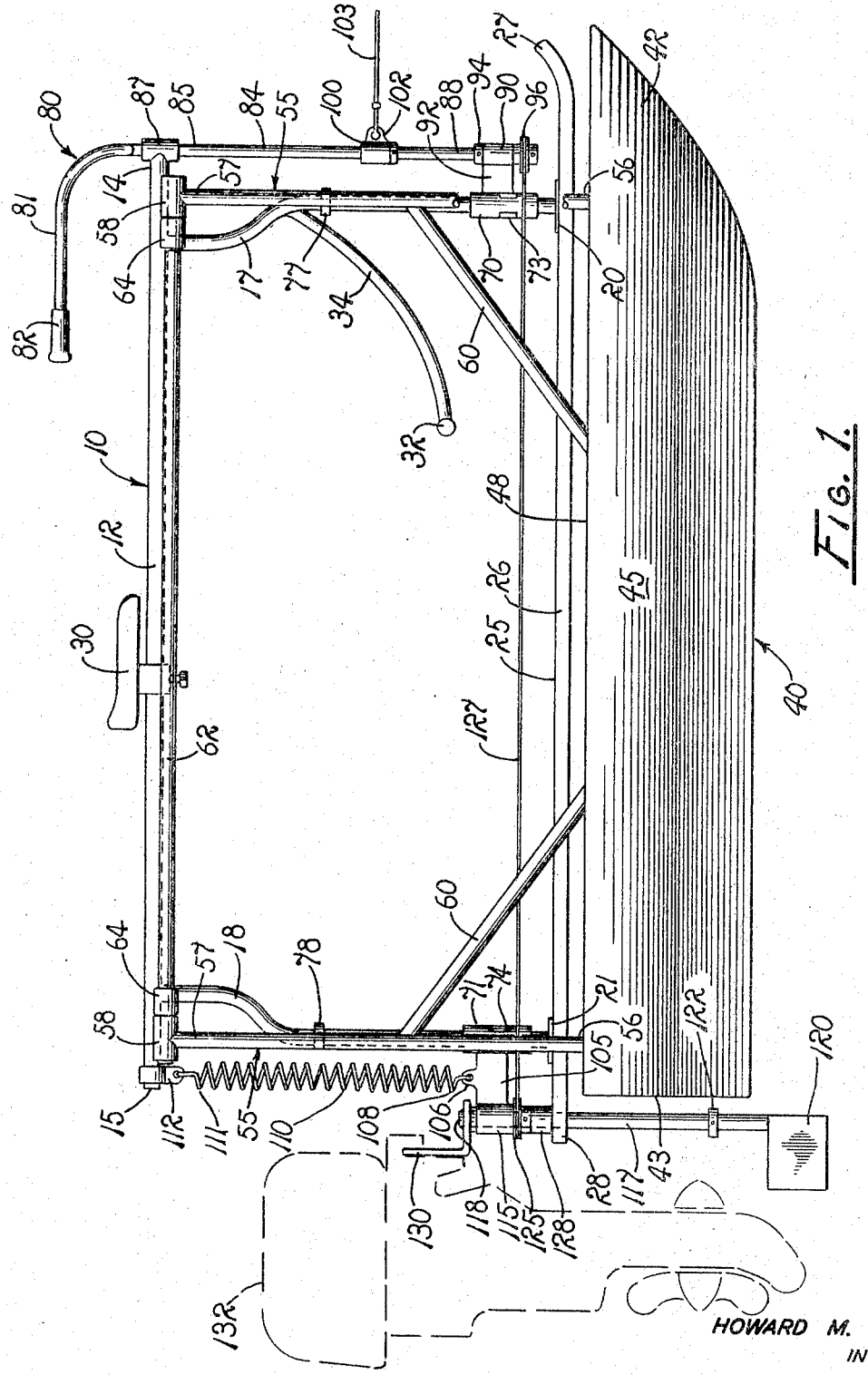
FIG. 1 is a side elevation of a water borne vehicle embodying the principles of the present invention showing a forwardly disposed towing connection and an opposite rearwardly extended bracket for alternatively mounting an outboard motor shown in dashed lines.

Referring more particularly to the drawings, a water borne vehicle embodying the principles of the present invention provides an elongated substantially rectagular frame 10 which is adapted to be propelled through a body of water 11 in a predetermined forward direction of travel. The frame includes an elongated upper tubular member 12 providing predetermined forward and rearward ends 14 and 15 respectively. A pair of depending tubular guide members 17 and 18 provide inwardly offset upper ends which are individually secured, as by welding or the like, to the forward and rearward ends of the upper tubular member. The guide members include lower flanged ends 20 and 21, respectively, which are secured by a plurality of appropriate fastener members, such as screws or the like, to the upper surface 25 of an elongated ski board 26. The ski board has an upturned forward end 27 and an opposite substantially straight rearward end 28. The upper tubular member 12, tubular guide members 17 and 18, and the ski board 26 are all disposed in symmetrical relation along a common substantially upright plane which is aligned with the predetermined forward direction of travel of the vehicle. A bicycle-type operator seat 30 is adjustably mounted on the upper tubular member 12 for longitudinal movement intermediate its ends. A laterally extended footrest 32 is mounted in predetermined spaced relation beneath the seat on an arcuate tubular member 34 rearwardly extended from the forward guide member 17.

The water borne vehicle of the present invention provides an elongated hull 40 having a substantially pointed bow 42 and an opposite stern 43 longitudinally split into a pair of identical mirror image hull sections 45. The sections include substantially flat inner mating surfaces 46 and substantially flat upper surfaces 48. The hull sections further include outer contoured surfaces 50 which terminate in relatively narrow lower keel portions 52. The hull sections are constructed of a lightweight buoyant solid material or may be of hollow construction and filled with a suitable foam plastic or the like for maintaining the buoyancy of the sections.

A pair of elongated tubular arms 55 provide lower L-shaped ends 56 which are individually secured to the upper surfaces 48 of each of the hull sections 45, respectively adjacent to the bow 42 and the stern 43 of the hull 40. The arms provide upper inwardly angularly extended ends 57 which mount a tubular sleeve 48 thereon, as by welding, on an axis transversely related to the arm. An elongated tubular brace 60 is angularly extended in interconnecting relation between each of the arms at a point intermediate their ends and their respective hull sections 45. The sleeves 58 of each hull section are individually disposed in circumscribing relation upon the opposite ends of an elongated pivot rod 62 which is journaled within a pair of tubular bearing sleeves 64 secured to the upper tubular member 12 of the frame 10, as by welding or the like. The sleeves 58 are secured against relative rotation and axial displacement on the pivot rod by pins 65 extended through aligned bores therethrough.

A pair of forward and rearward hull section positioning sleeves 70 and 71, respectively, are individually disposed in circumscribing relation for elevational reciprocal movement upon their respective forward and rearward guide members 17 and 18. Each of the sleeves provides a pair of diametrically opposed outwardly extended brackets 73 and 74, respectively. A plurality of control links 76 are individually pivotally connected at their inner ends to their associated brackets 73 and 74 and at their outer ends are connected to a pair of brackets on their adjacent arms 55. A pair of stop collars 77 and 78 are rigidly individually mounted on the forward and rearward guide members 17 and 18, respectively, at a point intermediate their ends to limit upward movement of their respective positioning sleeves 70 and 71 and lateral separation of the hull sections 45.

A vehicle steering mechanism, generally indicated by the reference numeral 80, is disposed at the forward end of the frame immediately above the bow 42 of the hull 40. The steering mechanism provides a handle bar 81 having opposite gripping ends 82 and a centrally depending control rod 84. The control rod includes an upper end 85 rotationally axially slidably extended through a tubular guide sleeve 87 secured, as by welding, to the forward end 14 of the upper tubular member 12 of the frame 10. The control rod has an opposite lower end 88 journaled in a bearing sleeve 90 secured in forwardly extended relation from the forward hull positioning sleeve 70 by a mounting bracket 92. A collar 94 is pinned to the control rod immediately above the bearing sleeve 90 to preclude relative downward movement of the rod with respect to the sleeve. A pulley 96 is mounted on the lower end of the control rod below the bearing sleeve 90 to preclude upward relative movement therebetween. A towing sleeve 100 is rigidly mounted on the control rod 84 intermediate its ends and provides a forwardly extended connector ring 102 for attaching a towing cable fragmentarily indicated by the reference numeral 103.

A spring mounting plate 105 is secured, as by welding, to the hull positioning sleeve 71 in rearwardly extended relation therefrom. The plate provides an upwardly extended ring 106 for receiving the lower hooked end 108 of an elongated tension spring 110 which has an opposite upper end 111 connected to the rearward end 15 of the upper tubular member 12 of the frame 10 by a hanger bracket 112.

A tubular bearing 115 is rigidly mounted, as by welding, on the rearward end of the spring mounting plate 105. An elongated rudder rod 117 is extended for rotation through the bearing and has an enlarged head end 118 engageable with the top surface of the bearing to limit axial downward movement of the rod through the bearing. The rudder rod is extended downwardly through the rearward end 28 of the ski board 26 and terminates in a lower substantially rectangular rudder 120. A stop collar 122 is secured in circumscribing relation about the rod closely adjacent to the rudder for engagement with the lower surface of the ski board to limit upward travel of the rudder. A pulley 125 is mounted on the rudder rod 117 immediately below the bearing 115 in coplanar relation with the pulley 96 on the steering control rod 84. An endless cable 127 is trained about the pulleys to transmit rotary movement of the handle bar 81 to the rudder 120. A spacer sleeve 128 is disposed in circumscribing relation upon the rudder rod 117 between the pulley 125 and the ski board. An L-shaped motor mounting plate 130 is rigidly secured to the head end 118 of the rudder rod in rearwardly disposed upwardly extended relation therefrom to mount an outboard motor thereon, as indicated in dashed lines by the reference numeral 132.

Operation

The operation of the described embodiment of the subject invention is believed to be clearly apparent and is briefly summarized at this point. With the water borne vehicle of the present invention disposed in its static or "at rest" condition in the water, the hull sections 45 of the hull 40 are disposed in their widely separated positions of FIG. 3 for maximum stability of the vehicle. It is noted that the hull sections are nearly completely submerged and the ski board 26 is disposed completely beneath the surface of the water. Accordingly, the vehicle is capable of supporting a person on the seat 30 with substantially no chance of the vehicle overturning or tipping to any position which might endanger the rider. The seat is easily adjusted longitudinally of the upper tubular member 12 to insure that the rider, irrespective of size, can easily reach the gripping ends 82 of the handle bar 81 and that the rider's feet can be rested upon the footrest 32. It is further noted that the hull positioning sleeves 70 and 71 are disposed against their respective stop collars 77 and 78 to limit any further lateral outward separation of the hull sections 45 and to insure that the inner pivot ends of the control links 76 are disposed somewhat below their outer pivotal ends connected to the hull section arms 55 so that the hull positioning sleeves automatically slide downwardly incident to any inward movement of the hull sections.

Figure 2:
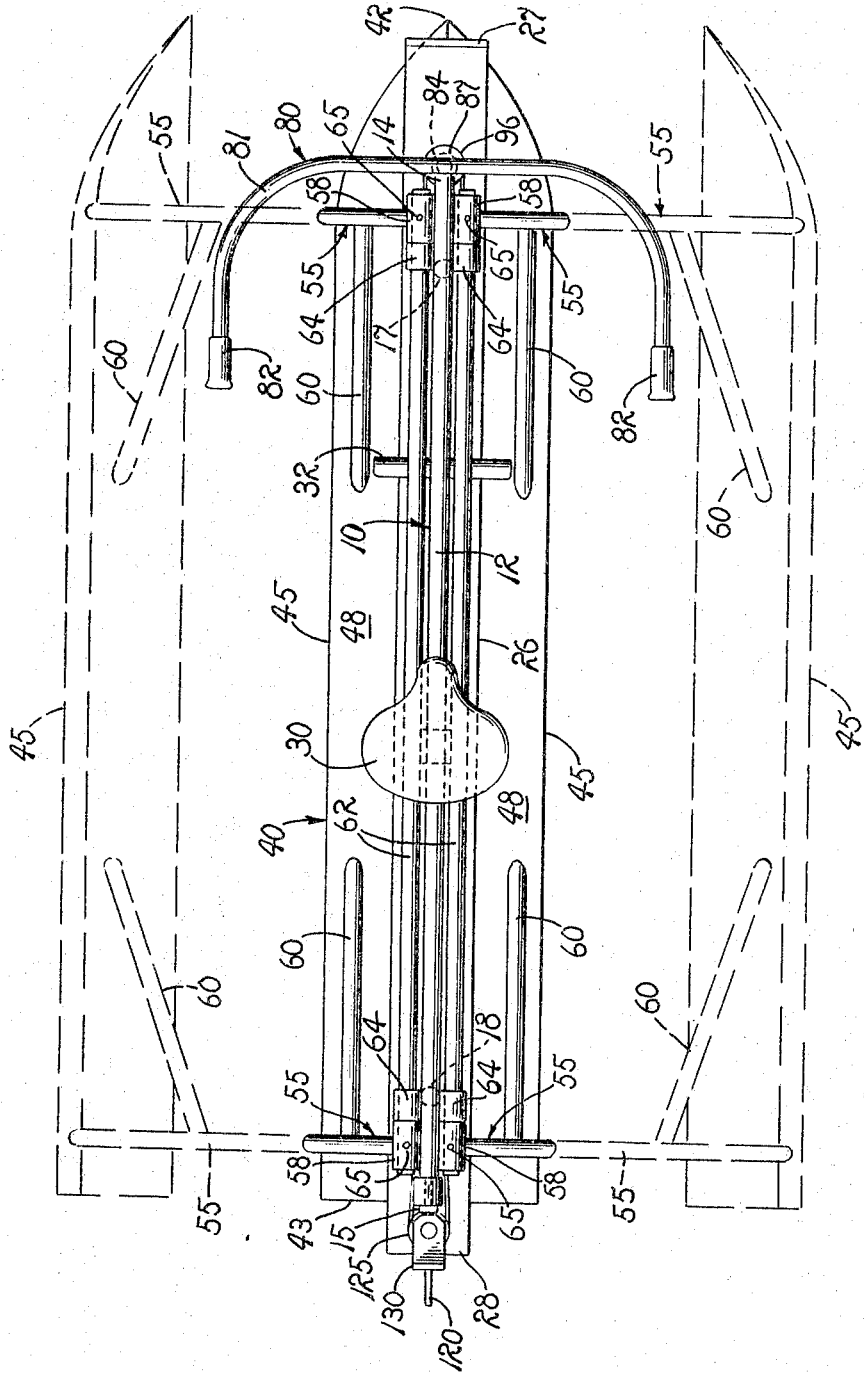
FIG. 2 is a top plan view of the water borne vehicle having a longitudinally split hull showing a high speed planing or maneuvering position in full lines and showing the sections of the hull swung outwardly to a separated position in dashed lines.

Upon propulsion of the water borne vehicle through the water, either by the towing cable 103 or the outboard motor 132, the hull sections 45 begin immediately to move laterally inwardly toward their retracted planing or maneuvering position of FIGS. 1, 2 and 5. Such movement is effected by the reaction of the water flowing against and along the pointed bow ends of the sections and along their outer contoured surfaces 50 which have a greater surface area than the inner flat surfaces 46. Such movement is also initiated by the lifting effect provided by the ski board 26 which carries the frame 10 upwardly therewith as the hull positioning sleeves 70 and 71 slide downwardly on their respective forward and rearward tubular guide members 17 and 18 of the frame incident to the described inward movement of the hull sections. Such inward movement of the hull sections continues in direct proportion to the increase in vehicle speed so as to provide maximum stability in all operational speeds of the vehicle. Accordingly, as the speed of the vehicle increases, the hull sections move closer together until the ski board 26 is raised completely out of the water to a position disposed above the upper surfaces 48 of the hull sections whereby the vehicle presents an ever-decreasing amount of drag or resistance to movement as it is propelled through the water. During such movement, the tension on the spring 110 is correspondingly increased to provide an opposite force tending to urge the hull sections apart immediately upon any decrease in the speed of the vehicle so as always to maintain maximum stability.

As the vehicle approaches its maximum speed, the inner surfaces 46 of the hull sections 45 come together in intimate facing engagement to form the complete hull 40, as shown in FIG. 5, with the hull being raised upwardly in the water so that only the keel portion 52 thereof is submerged to present a minimum of resistance against movement and for maximum maneuverability of the vehicle. It is noted that the rudder 120 is maintained at a constant depth within the water immediately below the keel portion 52 of the hull 40 by its connection with the rearward hull positioning sleeve 71. Accordingly, the rider has maximum steering control in all operating conditions and speeds of the vehicle for maneuvering the vehicle by manipulation of the steering mechanism 80 in the usual manner.

Upon deceleration of the vehicle, the tension spring 110 immediately returns the hull positioning sleeves 70 and 71 upwardly on their respective tubular guide members 17 and 18 of the frame to shove the hull sections 45 laterally outwardly toward their separated positions of FIG. 3. Such movement causes a corresponding lowering of the frame and re-entry of the ski board 26 into the water for increased stability.

In view of the foregoing, it is readily apparent that the structure of the present invention provides a water borne vehicle having greatly improved stability over existing water borne vehicles particularly during slow speed operation and when the vehicle is disposed in a static or "at rest" position in the water without impairing its maneuverability during high speed operation. This highly stable structure is capable of supporting a rider in a comfortable sitting position under all operating conditions without requiring any balancing effort so that the vehicle can be used by even the most inexperienced riders, irrespective of their athletic ability.

Although the invention has been herein shown and described in what is conceived to be the most practical and preferred embodiment it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A water borne vehicle comprising a pair of separable flotation members, means interconnecting said flotation members for relative movement between a substantially separated position and a substantially closed position, and means connected to the flotation members responsive to water resistance during movement for automatically moving the flotation members toward said closed position incident to increased speed of movement and toward said separated position incident to decreased speed of movement.

2. The water borne vehicle of claim 1 including biasing means connected between said flotation members and said means interconnecting the flotation members, said biasing means being tensioned by said movement of the flotation members to their closed position so as automatically to return them toward their separated position upon deceleration of the vehicle.

3. The water borne vehicle of claim 2 in which said means interconnecting said flotation members comprises a rider support frame having a lower portion automatically elevationally movable between a submerged position when said flotation members are in their separated position and a raised position with said lower portion disposed above the water when the flotation members are in their closed position.

4. A water borne vehicle adapted to be propelled through the water in a predetermined forward direction of travel comprising an elongated rider support frame; a pair of elongated separable buoyant hull members providing inwardly facing substantially flat surfaces and opposite outer contoured surfaces; means pivotally mounting said hull members on the frame for simultaneous lateral swinging movement between a relatively separated position and a relatively retracted water planing position with the inner surfaces disposed in intimate facing engagement; biasing means connected between said hull members and the frame to urge said hull members toward their separated position, said biasing means being tensioned by said movement of the hull members to their retracted water planing position incident to the force of water acting against said outer contoured surfaces of the hull members during propulsion of the vehicle in said predetermined forward direction of travel through the water and being effective automatically to return the hull members toward their separated position upon deceleration of the vehicle.

5. The water borne vehicle of claim 4 wherein said frame has an upper rider support portion and the lower portion comprises an elongated ski disposed in a submerged position when said hull members are in their separated position and being raised upwardly through and out of the water to a position disposed above said hull members incident to propulsion of the vehicle through the water and movement of the hull members to their retracted planing position.

6. The water borne vehicle of claim 5 in which the frame provides opposite forward and rearward ends and includes a pair of substantially upright elongated tubular guide members individually disposed at said forward and rearward ends of the frame in interconnecting relation between said upper portion of the frame and said ski with said upper portion, ski and tubular members being disposed in a common plane aligned with said forward direction of travel of the vehicle; said means pivotally mounting said hull members on the frame comprising a pair of elongated arms having upper ends pivotally mounted on said upper portion of the frame and opposite lower ends individually secured to the hull members; a sleeve reciprocably slidably mounted on one of said tubular members of the frame; and link means having opposite ends individually pivotally connected to said sleeve and to said arms for simultaneous lateral swinging movement of the hull members between their separated and retracted positions with said sleeve being traveled downwardly toward said ski as the hull members move to their retracted position and being traveled oppositely upwardly as the hull members move to their separated position.

7. The water borne vehicle of claim 6 including stop means on said one of said tubular members of the frame to limit upward movement of the sleeve and separation of the hull members.

8. The water borne vehicle of claim 7 wherein said biasing means comprises an elongated tension spring having an upper end connected to said upper portion of the frame and an opposite lower end connected to said sleeve.

9. The water borne vehicle of claim 8 including steering means slidably mounted for reciprocable movement on said forward tubular member of the frame with said sleeve being mounted on said rearward tubular member, rudder means mounted on said sleeve for elevational movement therewith so as substantially to maintain the rudder at a constant predetermined depth within the water in all operational positions of said hull members, and means controllably connecting said steering means and said rudder means.

10. The water borne vehicle of claim 9 including a towing connection on said steering means, and a motor mounting bracket borne by said rudder means in rearwardly extended relation from the vehicle.

No references cited.

MILTON BUCHLER, *Primary Examiner.*

P. E. SAUBERER, *Assistant Examiner.*